United States Patent
Singer et al.

(10) Patent No.: US 9,242,617 B2
(45) Date of Patent: Jan. 26, 2016

(54) SEAT BELT RETRACTOR WITH A SPEED-REGULATED FORCE-LIMITING DEVICE

(75) Inventors: Klaus-Peter Singer, Hamburg (DE); Ronald Jabusch, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 133 days.

(21) Appl. No.: 13/978,605

(22) PCT Filed: Dec. 8, 2011

(86) PCT No.: PCT/EP2011/006167
§ 371 (c)(1),
(2), (4) Date: Aug. 16, 2013

(87) PCT Pub. No.: WO2012/095133
PCT Pub. Date: Jul. 19, 2012

(65) Prior Publication Data
US 2013/0320127 A1    Dec. 5, 2013

(30) Foreign Application Priority Data
Jan. 12, 2011  (DE) .......................... 10 2011 008 405

(51) Int. Cl.
*B60R 22/34* (2006.01)
*B60R 22/405* (2006.01)
*B60R 22/28* (2006.01)

(52) U.S. Cl.
CPC ............... *B60R 22/34* (2013.01); *B60R 22/341* (2013.01); *B60R 22/405* (2013.01); *B60R 2022/285* (2013.01)

(58) Field of Classification Search
CPC .... B60R 22/40; B60R 22/41; B60R 2022/402
USPC ......... 242/376, 376.1, 379, 384, 384.2, 384.4
See application file for complete search history.

(56) References Cited

U.S. PATENT DOCUMENTS

| 4,206,887 A | 6/1980 | de Rosa et al. |
|---|---|---|
| 4,483,494 A | 11/1984 | Takada |

(Continued)

FOREIGN PATENT DOCUMENTS

| DE | 202 07 276 U1 | 10/2002 |
|---|---|---|
| DE | 10 2005 016 822 B3 | 1/2007 |

(Continued)

OTHER PUBLICATIONS

PCT International Search Report—Apr. 27, 2010.

(Continued)

*Primary Examiner* — Emmanuel M Marcelo
*Assistant Examiner* — Angela Caligiuri
(74) *Attorney, Agent, or Firm* — Brinks Gilson & Lione

(57) ABSTRACT

A seat belt retractor with a speed-controlled load limiting device has a belt shaft pivot-mounted in a retractor frame, a blocking device for locking the belt shaft relative to the retractor frame) in the belt extraction direction when a predetermined value of the belt webbing extraction acceleration and/or of vehicle deceleration is exceeded, and at least two toothed elements which, upon activation of the load limiting device move relative to each other. One of the toothed elements performs an oscillatory motion, wherein both parts feature teeth, with which they alternately engage and disengage during the relative motion belt shaft has a first and a second part. The second part can be locked relative to the retractor frame, and each of the toothed elements is allocated to a different part of the belt shaft.

16 Claims, 8 Drawing Sheets

(56) References Cited

U.S. PATENT DOCUMENTS

| | | |
|---|---|---|
| 4,943,011 A | 7/1990 | Kitamura et al. |
| 5,297,752 A | 3/1994 | Brown et al. |
| 5,601,251 A | 2/1997 | Hishon et al. |
| 5,636,806 A | 6/1997 | Sayles |
| 5,769,345 A | 6/1998 | Morner et al. |
| 6,098,772 A | 8/2000 | Kimmig et al. |
| 6,260,782 B1 | 7/2001 | Smithson et al. |
| 6,409,115 B1 | 6/2002 | Specht et al. |
| 6,443,382 B1 * | 9/2002 | Bae ............... B60R 22/405 242/382.6 |
| 6,454,201 B1 | 9/2002 | Strobel et al. |
| 6,871,813 B2 | 3/2005 | Bae |
| 6,932,324 B2 | 8/2005 | Biller et al. |
| 8,529,398 B2 | 9/2013 | Jabusch |
| 2002/0190515 A1 | 12/2002 | Birk et al. |
| 2003/0201357 A1 * | 10/2003 | Koning ............ B60R 22/3413 242/379.1 |
| 2005/0059524 A1 | 3/2005 | Hori et al. |
| 2005/0133330 A1 | 6/2005 | Stiefvater |

FOREIGN PATENT DOCUMENTS

| | | |
|---|---|---|
| DE | 10 2008 049 931 A1 | 5/2010 |
| DE | 10 2009 010 435 A1 | 9/2010 |
| EP | 1 069 009 A1 | 1/2001 |
| EP | WO 2003/020557 A1 | 3/2003 |
| EP | 1 222 097 B1 | 2/2004 |
| EP | WO 2006/108451 A1 | 10/2006 |
| EP | WO 2010/037460 A2 | 4/2010 |
| EP | WO 2010/139433 A1 | 12/2010 |
| FR | 2 528 928 | 6/1982 |
| JP | WO 2004/096611 A1 | 11/2004 |
| WO | WO 2007/130041 A1 | 11/2007 |
| WO | WO2010/037460 * | 4/2010 |

OTHER PUBLICATIONS

PCT International Search Report—Mar. 5, 2012.

* cited by examiner

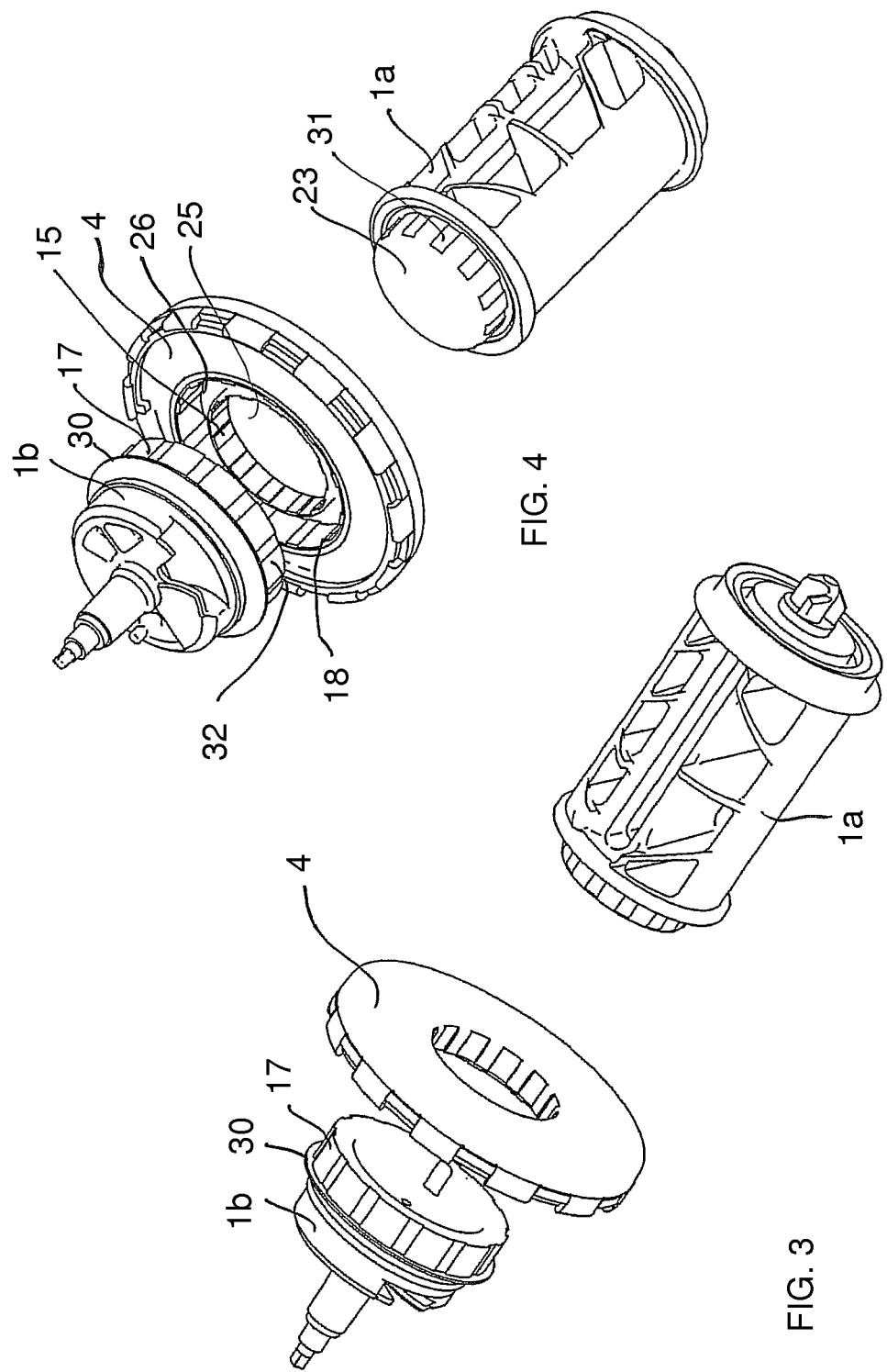

SEAT BELT RETRACTOR WITH A SPEED-REGULATED FORCE-LIMITING DEVICE

CROSS-REFERENCE TO RELATED APPLICATION

The present application is the National Phase of International Patent Application PCT/EP2011/006167, filed on Dec. 8, 2011, and claims the priority of German patent application DE 10 2011 008 405.3. filed on Jan. 12, 2011, the entire disclosure of which is included herein by reference.

TECHNICAL FIELD OF THE INVENTION

The invention relates to a seat belt retractor with a speed-controlled load limiting device for enabling a load-limited extraction of a belt webbing.

BACKGROUND OF THE INVENTION

A load limiting device for a seat belt retractor, for example, a speed-controlled load limiting device, is known from WO 2006/108451 A1 filed by this applicant; said device features a plurality of pendulum masses disposed on the frame of the seat belt retractor. The masses are seated so as to rotate on the retraction frame and during the load-limited unwinding of the seat belt, engage alternately with two teeth into a toothed ring connected to the belt shaft. Due to the pendulum masses disposed on the retractor frame, the seat belt retractor as a whole is complicated and expensive to manufacture. Furthermore, due to the pendulum masses the seat belt retractor requires a comparatively large installation space.

In the German patent application 10 2008 049 931.5 also filed by this applicant, an improved load limiting device operating on the basis of the same physical principle is described, in which the two toothed parts are moved with respect to each other in a force-limited manner and one of the parts executes a "wave shaped" forward motion in which the toothed parts alternately are engaged and disengaged. The pendulum masses are replaced by the part executing the wave-shaped forward motion, so that the load limiting device described therein requires a significantly smaller installation space and displays a significantly simpler structure. In one exemplary embodiment the part executing the wave-shaped forward motion is realized by a toothed disc which is friction-locked to the belt shaft.

Furthermore, from DE 10 2009 010 435 A1 a seat belt retractor with a speed-controlled load limiting device is known, in which for the activation thereof, the load limiting device is secured to a part on the frame of the seat belt retractor and is connectable to another part on the belt shaft. The part by which the load limiting device is connectable to the belt shaft is designed as a rotatable toothed ring in which a locking pawl seated on the belt shaft engages. During the load-limited belt extension motion, the torque from the toothed ring is directed via axial fingers into a toothed flywheel which then begins a rotational motion with an overlapping, transverse-directed oscillatory motion which alternately engages and disengages with teeth arranged on the frame of the seat belt retractor. During this rotational motion the oscillating disc is periodically accelerated and decelerated, so that the destruction of energy underlying the load limiting principle is effected. One disadvantage of this design is seen in that, upon activation of the blocking device, the toothed ring must have a particular alignment to the engaging locking pawl so that the locking pawl does not undergo false locking against the peak of the tooth. Therefore, the engaging motion of the locking pawl must be synchronized with the alignment of the toothed ring, which in turn can be problematic since the alignment of the toothed ring itself is established by its assembly to the retractor frame. Thus, the alignment of the toothed ring has a certain, unavoidable tolerance due to manufacturing tolerances for the toothed ring itself and its attachment points to the retractor frame and these tolerances complicate the synchronization of the motion of the locking pawl.

SUMMARY OF THE INVENTION

The objective of the invention is to create an alternative, cost-effective and compact seat belt retractor with a speed-controlled load limiting device.

According to the invention, the belt shaft has an at least two-part configuration consisting of a first and a second part, that the belt webbing can be wound onto the first part, and that, upon actuation of the blocking device, the second part of the belt shaft can be locked relative to the retractor frame, and that each of the parts which are movable relative to each other is allocated to a different part of the belt shaft. Thus, the belt shaft forms a unit together with the load limiting device that is cost-effective to assemble, wherein the remaining components of the belt retractor can be adopted in a cost-effective manner from existing belt retractors without any design changes. Owing to the two-part design of the belt shaft and to the proposed allocation of parts of the load limiting device to the parts of the belt shaft, the load limiting device, in the event of locking of the belt shaft, is automatically located in the force flow between the belt webbing and the vehicle-mounted retractor frame, so that when a predefined belt extraction force is exceeded, the device is automatically activated and the belt extraction motion is subsequently controlled by the speed-regulated load limiting device. Furthermore, the parts of the load limiting device can be arranged at any particular alignment with respect to each other and to the parts of the belt shaft, including the blocking device, without thereby causing disadvantages for any potentially necessary synchronization of the engaging motion of the locking pawl.

The invention will be explained in greater detail below based on preferred embodiments and with reference to the attached figures.

BRIEF DESCRIPTION OF THE DRAWINGS

In the drawings, the figures depict the following:
FIG. 3: First view of a two-part belt shaft with load limiting device, in exploded representation;
FIG. 4: Second view of a two-part belt shaft with load limiting device, in exploded representation.

DETAILED DESCRIPTION OF THE DRAWINGS

Figure 1:
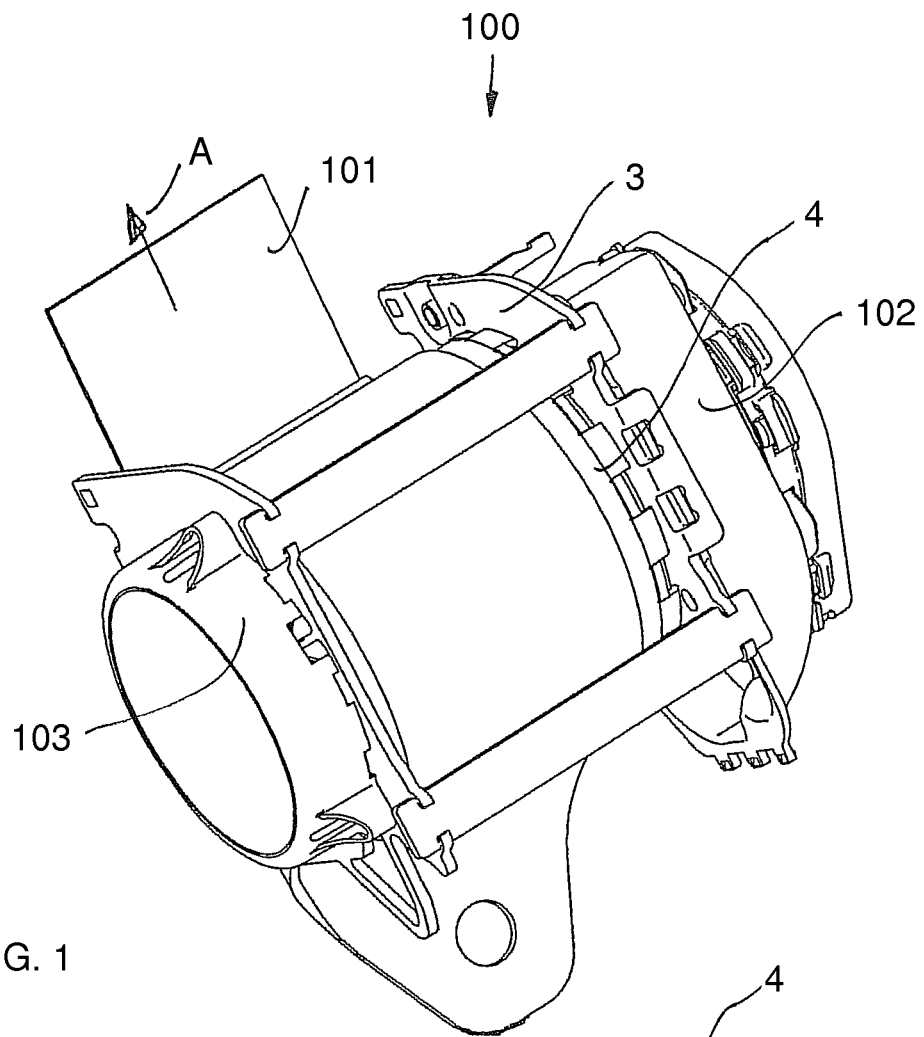
FIG. 1: Seat belt retractor with belt tensioner.
Figure 2:
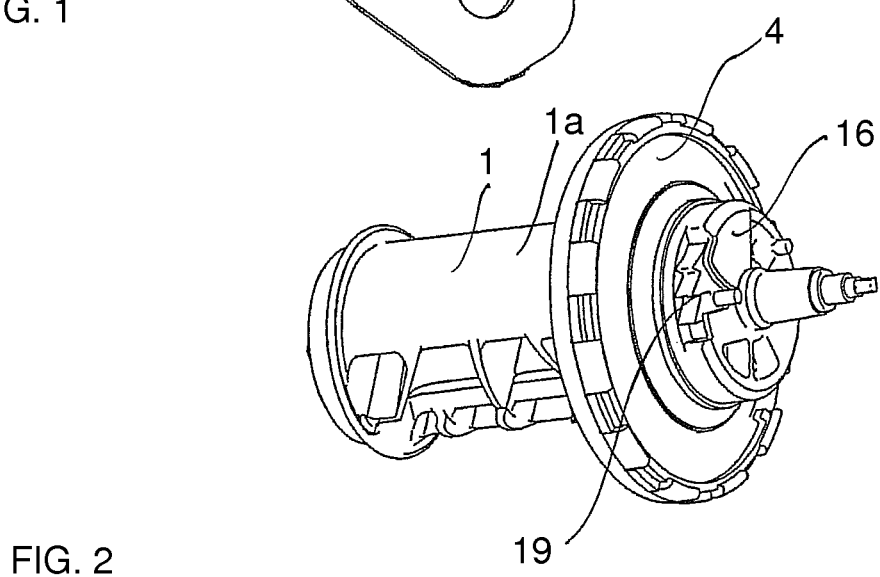
FIG. 2: Belt shaft with load limiting device.
Figure 6:
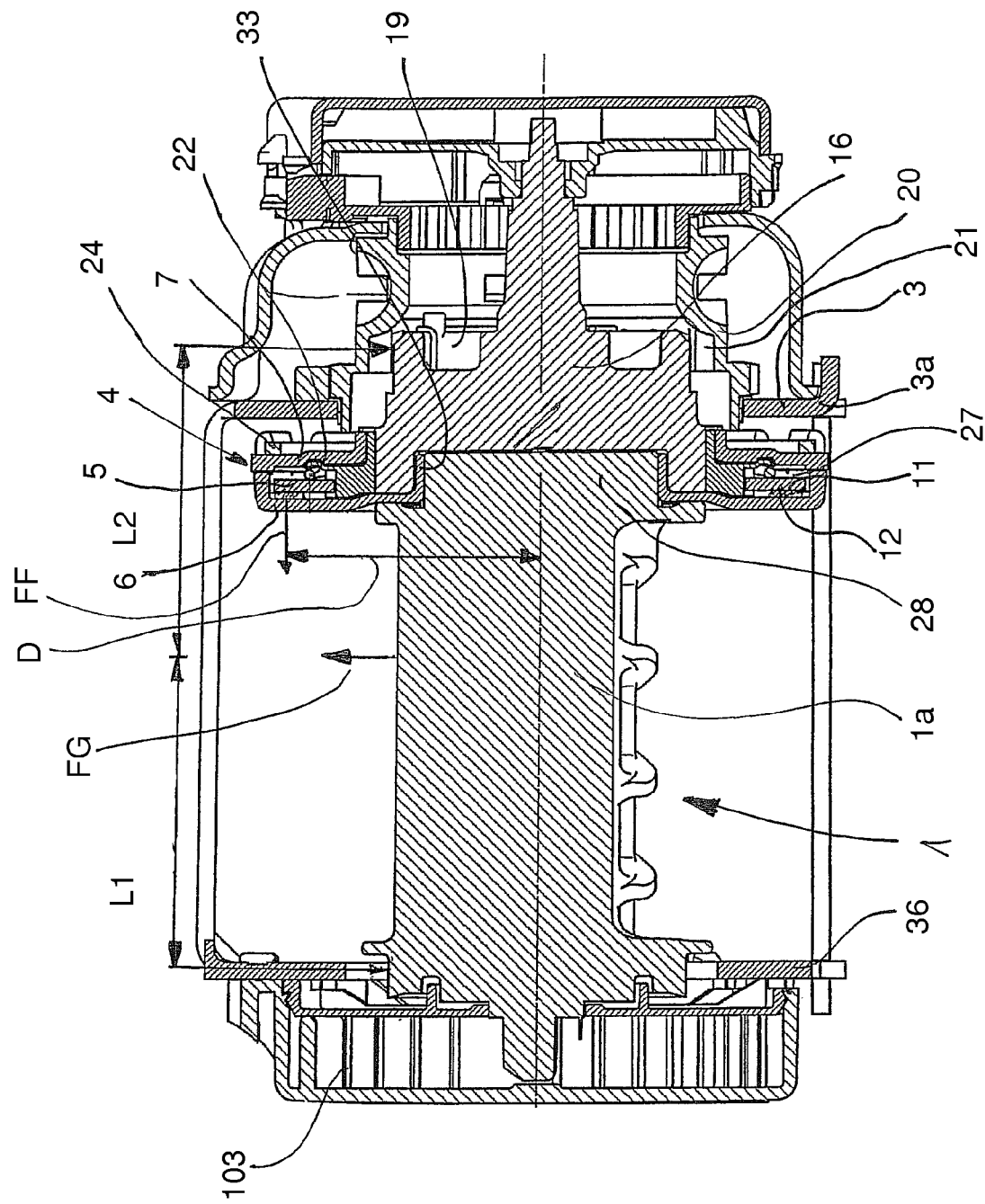
FIG. 6: Seat belt retractor with a load limiting device in a first embodiment, cross-sectional representation.

FIG. 1 depicts a belt retractor 100 according to the invention, with a retractor frame 3, a belt tensioner 102 disposed on the retractor frame 3, and a volute spring cassette disposed on the opposite side of the retractor frame 3. As is also depicted in FIG. 6, the retractor frame 3 has a U-shaped design with two opposing brackets 3a and 3b and is used both for securing the belt retractor 100 to a motor vehicle and also for mounting of a—in this case two-part—belt shaft 1.

The belt shaft 1 is of two-part design with a first part 1a and a second part 1b, which are connected to each other via a speed-controlled load limiting device 4. Coiled around the first part 1a of the belt shaft 1 is a belt webbing 101 which can be pulled out in direction of arrow A against the spring force of the coil spring arranged in the spring cassette 103. The second part 1b of belt shaft 1 is lockable against the retractor frame 3 and thus also against the vehicle via a blocking device 19 in the form of a locking pawl when a predetermined value of the belt webbing extraction acceleration and/or of the vehicle deceleration is exceeded, so that the seat belt extraction is subsequently possible only upon activation of the load limiting device 4.

The load limiting device 4 is designed as a preassembled component with a first, central annular opening 25 and a second annular opening 26 arranged concentrically thereto; said second opening has a greater diameter wherein both the first and also the second openings 25 and 26 are equipped with a profiling 15 and 18 as is evident in FIG. 4.

Figure 5:
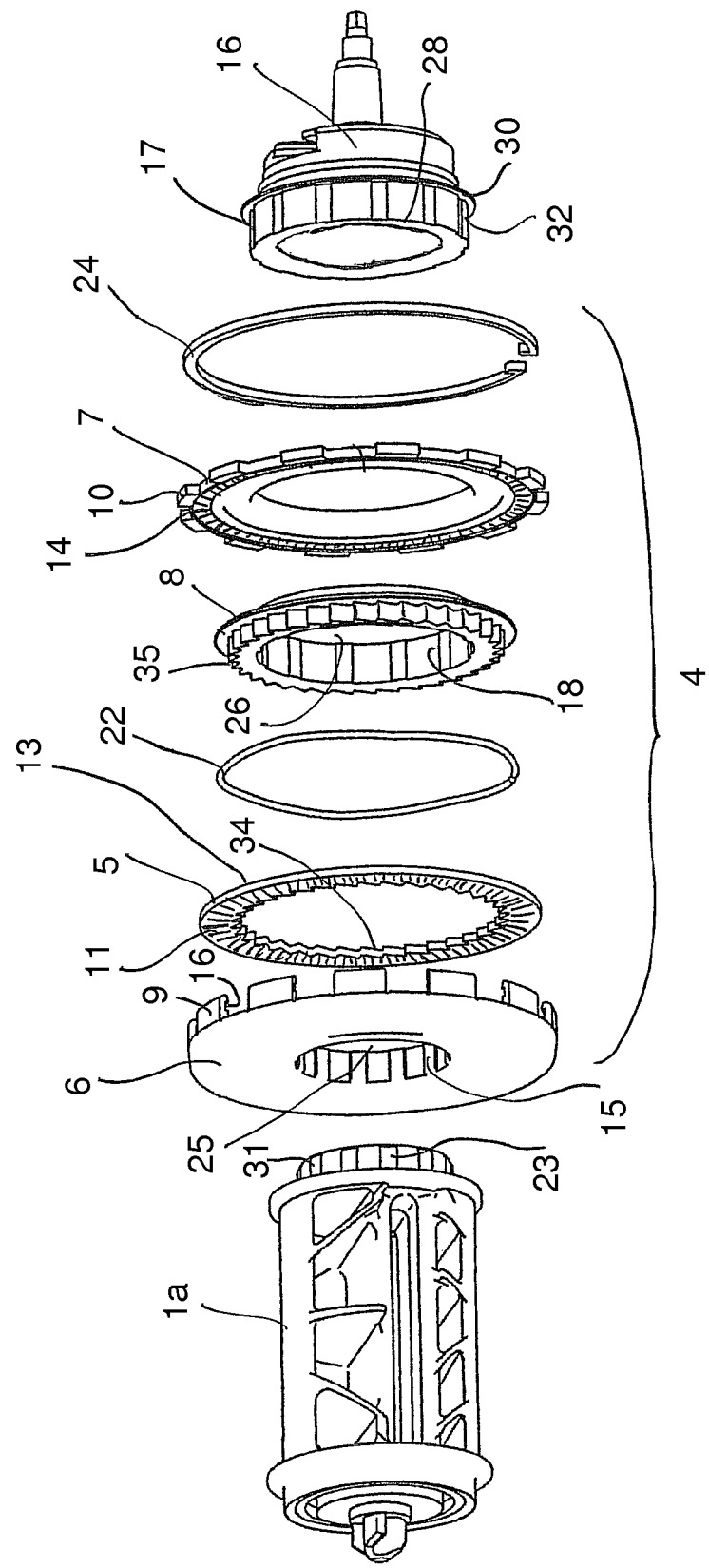
FIG. 5: Two-part belt shaft with load limiting device showing individual parts.

The first part 1a of the belt shaft 1 is provided for winding the belt webbing 101 and features an axially directed, cylindrical extension 23 which likewise is equipped with a profiling 31. The second part 1b of belt shaft 1 features a cylindrical extension 17 with an external profiling 32 on which a radial interior recess 28 is created which is slightly larger than the extension 23 on the first part 1b of the belt shaft 1 (see FIG. 5). The profiling pairs 31 and 15 and also 32 and 18 are shaped identically and can be designed preferably as multi-tooth profiles.

The load limiting device 4 itself comprises a first part 6 in the form of a ring-shaped disc which is equipped on the outer edge thereof with axially directed lugs 9 and on the central opening 25 thereof with an annular flange 33. Part 6 is produced preferably in a non-machining method, such as for example, a stamping method, in which both the lugs 9 and the flange 33 including the profiling 15 thereon are also created. Furthermore, the load limiting device 4 comprises a second part 7 which likewise is designed as an annular disc with a central opening and features a plurality of regularly spaced radial tabs 10 on the outer edge thereof. The width and spacing of the radial tabs 10 is dimensioned so that they fit precisely between the axially aligned extensions 9 of part 6.

In addition, the load limiting device 4 comprises a part 5 in the form of a ring disc with two axially directed toothed parts 11 and 13 and one radially inward directed toothed part 34. The toothed part 11 is shaped in such a manner that it comes to engage with an opposing toothed part 12 provided on part 6 and which is depicted in FIG. 6. Furthermore, a tang 8 is provided which forms the radial inward, central opening 26 of a greater diameter with profiling 18, and is equipped externally with a toothed part 35. As additional parts the load limiting device 4 also comprises a wave-shaped coil spring 22 and a circlip 24.

The load limiting device 4 is assembled as a component in one preassembly step. First, the part 5, the coil spring 22 and the tang 8 are placed in that order into the part 6, wherein the tang 8 with teeth 35 is engaged in the teeth 34 of part 5 to obtain a rotationally locked connection. Next, the part 7 with the radial tabs 10 is inserted between the lugs 9 to establish a rotationally locked connection with part 6 and finally is secured by the circlip 34 which engages in corresponding, radial inward grooves 16 on the lugs 9. The coil spring 22 is thereby braced on one side against the part 7 and forces part 5 against part 6, so that the teeth 11 and 12 are engaged prior to the activation of the load limiting device 4.

The load limiting device 4 preassembled in this way is depicted in FIGS. 3 and 4 from different angles together with the first and the second parts 1a and 1b of the belt shaft 1.

Figure 8:
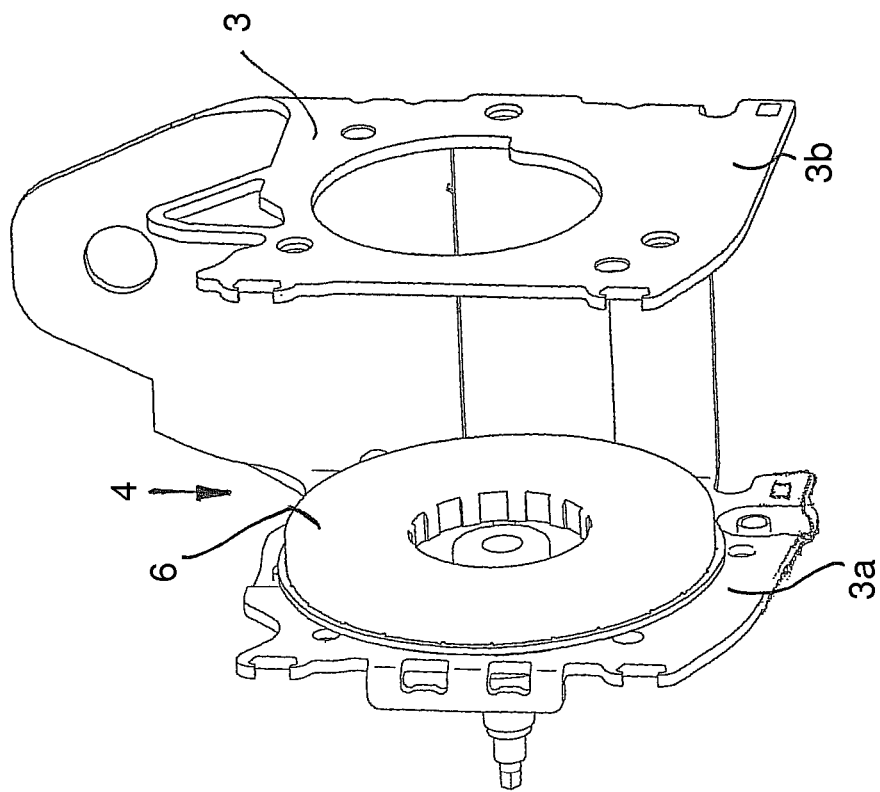
FIG. 8: Retractor frame with part of the belt shaft arranged thereon, with load limiting device.

During assembly of the seat belt retractor 100, the load limiting device 4 with the opening 26 of the tang 8 is pushed onto the tab 17 of the second part 1b of the belt shaft 1, whereupon the profiling 18 and 32 engage with each other and a rotationally locked connection is formed between the second part 1b of the belt shaft 1, the tang 8 and part 5. To limit the sliding motion of the load limiting device 4, the tab 17 is bounded by a stop 30 against which the tang 8 and the front face of part 7 come to rest in the end position. The unit composed of the second part 1b of the belt shaft 1 and the load limiting device 4 is then pushed into an opening of the bracket 3a of the retractor frame 3, as is depicted in FIG. 8. Next, the second part 1a of the belt shaft 1 is inserted through a second opening provided in the bracket 3b and pressed with the tab 23 into the opening 25 of part 6, so that the mutually engaged profiling 31 and 15 then form a rotationally locked connection between the part 6 and part 1b of the belt shaft 1, and the load limiting device 4 is subsequently arranged between the brackets 3a and 3b of the retracting frame 3.

The recess 28 in the second part 1b of the belt shaft 1 is larger than the tab 23 on the first part 1a, so that between the tab 23 and the inner wall of the recess 28 a gap is created in which the flange 33 of part 6 is located. Upon compression of the first part 1a of the belt shaft 1, the inner wall of the recess 28 can act as a counter support, so that the profiling 31 and 15 in every case will be forced into a friction locked engagement.

After the compression of the first part 1a of the belt shaft 1, the first part 1a together with the parts 6 and 7 and the second part 1b together with the tang 8 and the part 5 jointly form a rotationally locked connection. In the case that the second part 1b of belt shaft 1 is locked against the vehicle after the locking unit 19 is triggered, the tang 8 and the part 5 can also be considered to be affixed to the frame of the vehicle due to the rotationally locked connection. If the belt extraction force with the locked second part 1b exceeds a threshold value determined by the load limiting device 4, then the first part 1a of the belt shaft 1 can rotate in the extraction direction since the part 6 rotates with respect to the part 5, wherein part 5 executes the load limiting, wave-shaped oscillatory motion, during which the toothed parts 11 and 12 and 13 and 14 alternately engage and disengage with each other in pairs. Parts 5 and 6 and/or 7 thus execute a motion relative to each other, during which the parts 5, 6 and 7 are alternately decelerated and accelerated. The parts 6 and 7 thus perform a purely rotational motion which is controlled by the oscillatory motion of the part 5 directed transversely to the rotation motion. In this regard the part 5 with the toothed part 34 is arranged at a slight transverse offset to the toothed part 35 of the tang 8, so that it can execute the transversely directed oscillatory motion.

The load limiting device 4 and in particular the engaged region of toothed parts 11 and 12 and 13 and 14, and the part 5 itself are arranged in the overlapping region of the two parts 1a and 1b, formed by the tab 23 engaged in the recess 28, so that the load limiting device 4 and in particular the parts 5, 6 and 7 are sufficiently supported mechanically, even under the occurring forces, and their position relative to each other is retained even during the activation of the load limiting device 4. Since the parts 6 and 7 tightly connected to each other now form the cavity in which the part 5 executes the oscillatory motion, and moreover form a tight connection which is used to support the circlip 22 on the one hand, and to accommodate the axial forces acting in the toothed parts 11 and 12, the axial forces acting between parts 1a and 1b of the belt shaft 1 are reduced significantly, so that the belt shaft 1 itself is shape-stable, even with an activated load limiting device 4, and the parts 1a and 1b are not driven apart.

Figure 10:
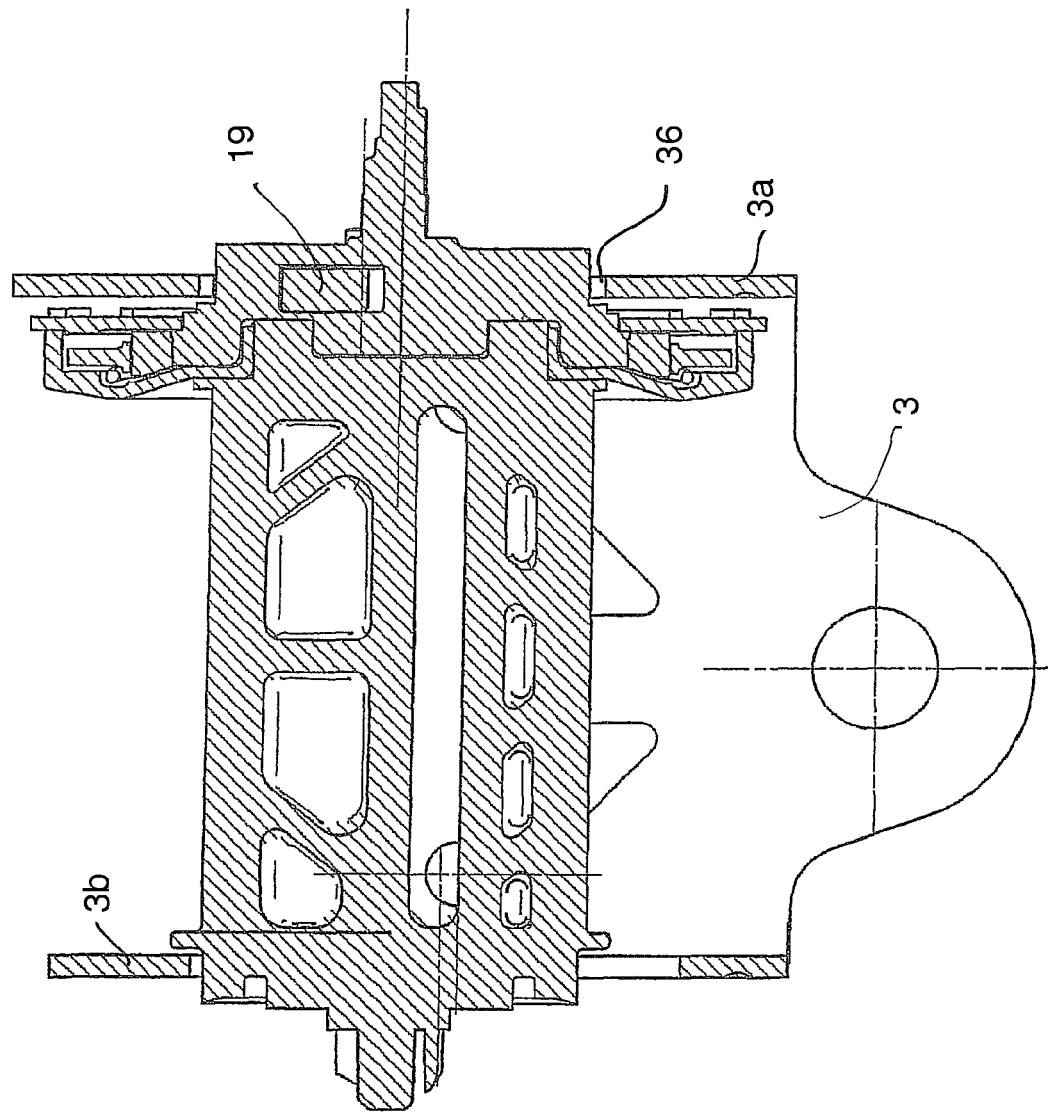
FIG. 10: Seat belt retractor with a load limiting device in a second embodiment, cross-sectional representation.

The locking of the second part 1b of the belt shaft 1 takes place in the exemplary embodiment of FIG. 6 by engaging the blocking device 19 in an inner toothed part 21 of a tensioner drive wheel 20 secured to the retractor frame 3 in the belt extension direction. Depicted in FIG. 10 is an alternative embodiment of the invention in which the blocking device 19 engages directly in a toothed part 36 of an opening of a bracket 3a of the retraction frame 3 to perform the locking.

The coil spring 22 is preferably dimensioned so that it exerts a spring force FF onto the engaged parts 5 and 6, which, when multiplied by the distance D of the line of application of the force of the axis of rotation of the belt retractor 1 (FF×D), is greater than the product of the maximum resulting belt extraction force FG times the distance L1, L2 to the bearing points of the belt shaft 1 (FG×L1). The line of application of the resulting belt extraction force FG is assumed to be located in the middle of the bearing points, so that L1 is equal to L2. Due to the proposed dimensioning of the coil spring 22 the flexion of the belt shaft 1 and/or the mutual tipping of the parts 1a and 1b of the belt shaft 1 is reduced or even eliminated entirely.

Figure 7:
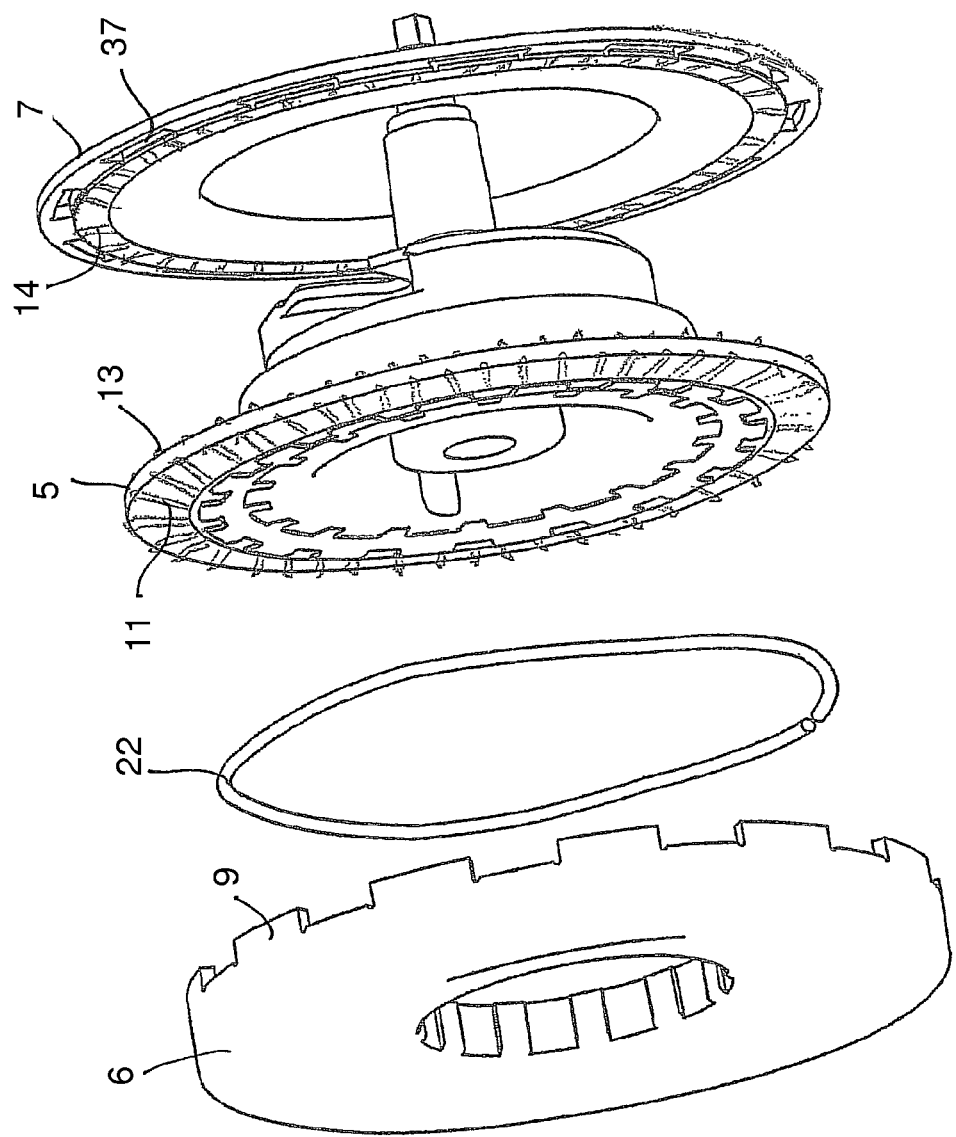
FIG. 7: Alternative load limiting device before assembly, shown in exploded representation.
Figure 9:
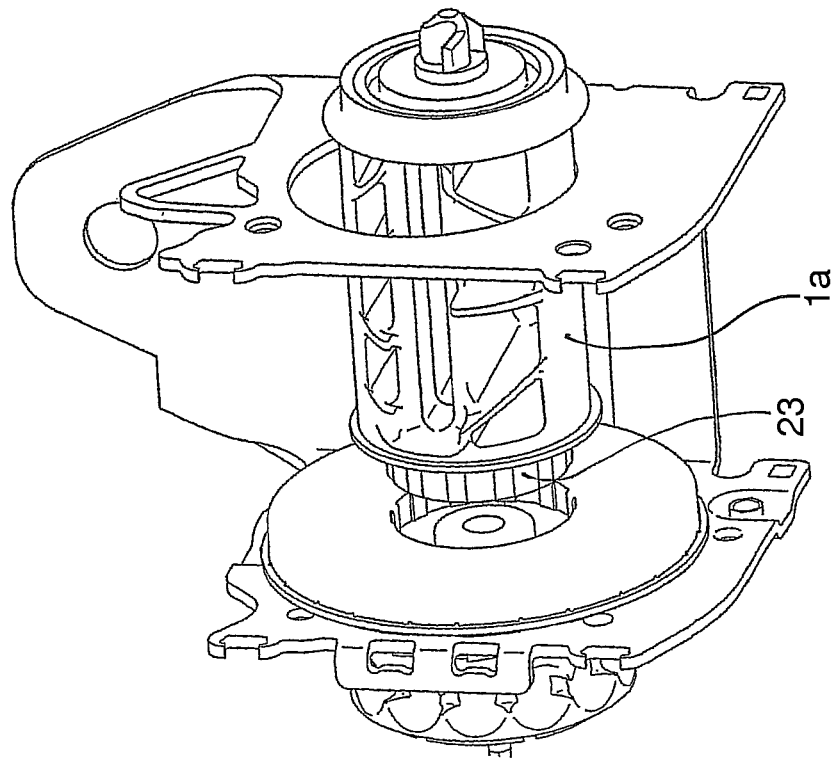
FIG. 9: Retractor frame from FIG. 8 with a second part of the belt shaft introduced on one side.

FIG. 7 depicts a somewhat modified embodiment of the invention, in which part 7 features window 37 with which the part 7 is pushed onto the lugs 9 of the part 6.

It is important for the success of the invention that the part 5, which executes the oscillatory motion directed transversely to the rotation motion of the parts 6 and 7 and to the rotational motion of the first part 1a of the belt shaft 1, and the parts 6 and 7 which execute the rotational motion without any transverse motion, are each allocated to different parts 1a and 1b of the belt shaft 1 which are intended to execute the force-limiting motion with respect to each other. Thus, the load limiting device 4 acts directly in the force flow between the parts 1a and 1b of the belt shaft 1, and the remaining parts of the belt retractor 100 can be adopted without change from a conventional belt retractor. In particular, the blocking device 19 can operate according to the conventional principle in a toothed gear attached to the housing, so that due to the proposed arrangement of the load limiting device 4, problems with respect to the synchronization of the blocking device 19 cannot occur.

Since the load limiting device 4 can be mounted as a pre-assembled unit during the assembly of the belt retractor 100, it can be pre-mounted as a unit in an external production site and then already be delivered as one component. Furthermore, due to the pre-assembled load limiting device 4, the assembly process as such is simplified, since, during the assembly process of the belt retractor 100, the individual parts of the load limiting device 4 no longer have to be handled separately. And in addition, the functionality and load limiting characteristics of the load limiting device 4 can be checked, at least by random sampling, in an external testing apparatus before mounting it onto the belt retractor 100.

Furthermore, from the arrangement of the load limiting device 4 between the brackets 3a and 3b the advantage is obtained that the forces in the load limiting device 4 are produced and operate between the brackets 3a and 3b so that the belt shaft 1 with the load limiting device 4 arranged therein is provided with a particularly good mechanical support. In addition, due to the proposed arrangement of the load limiting device 4, the bearing distance between the bearing points of the belt shaft 1 can be dimensioned as large as possible so that even with normal use the belt shaft 1 is very stable, given the compact structure of the belt retractor 100.

Furthermore, due to the formation of a central opening 25 in the load limiting device 4, with which it is arranged coaxially to the two parts 1a and 1b of the belt shaft 1, a compact structure of the belt retractor 100 can be attained, wherein the parts 1a and 1b of the belt shaft 1 extending into the opening 25 are thus additionally held together in a mechanically stable joint. Since the load limiting device 4 externally envelops the belt shaft 1 radially, the diameter can be further reduced, if necessary, in comparison to conventional belt shafts.

Moreover, due to the two concentric openings 25 and 26, the load limiting device 4 can be coupled to the two parts 1a and 1b of the belt shaft 1 in a very simple and compact manner. In addition, due to the concentric arrangement of the openings 25 and 26 and of the parts 5, 6 and 7, the load limiting device 4 can also be arranged concentrically to the axis of rotation of the belt shaft 1 and to the axis of rotation of the first part 1a executing the force-limiting rotational motion, so that the rotational motion of the first part 1a can be damped directly by the load limiting device 4, without any additional parts being required for a transfer of the motion sequence.

Figure 11:
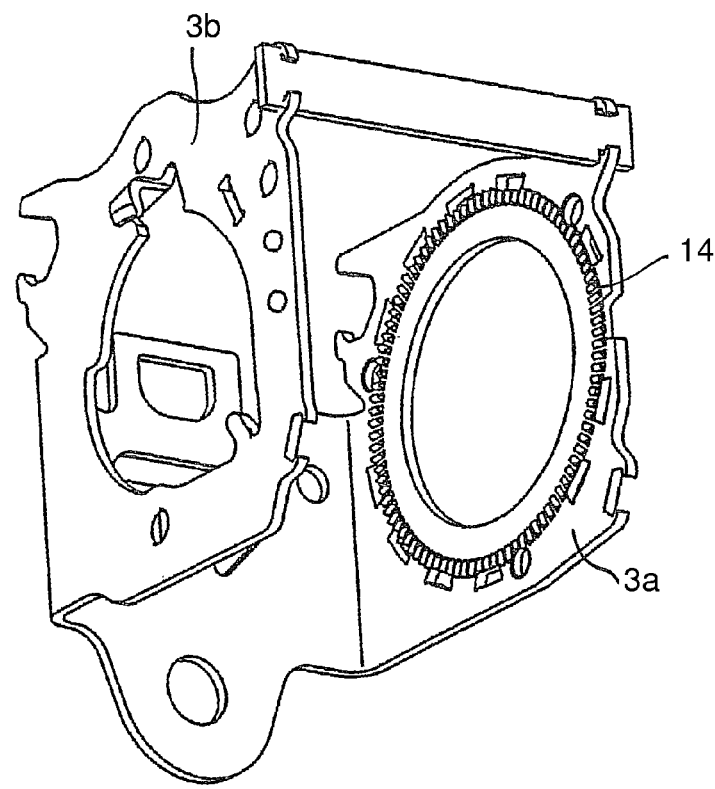
FIG. 11: Retractor frame with stamped axial toothed part in a first view.
Figure 12:
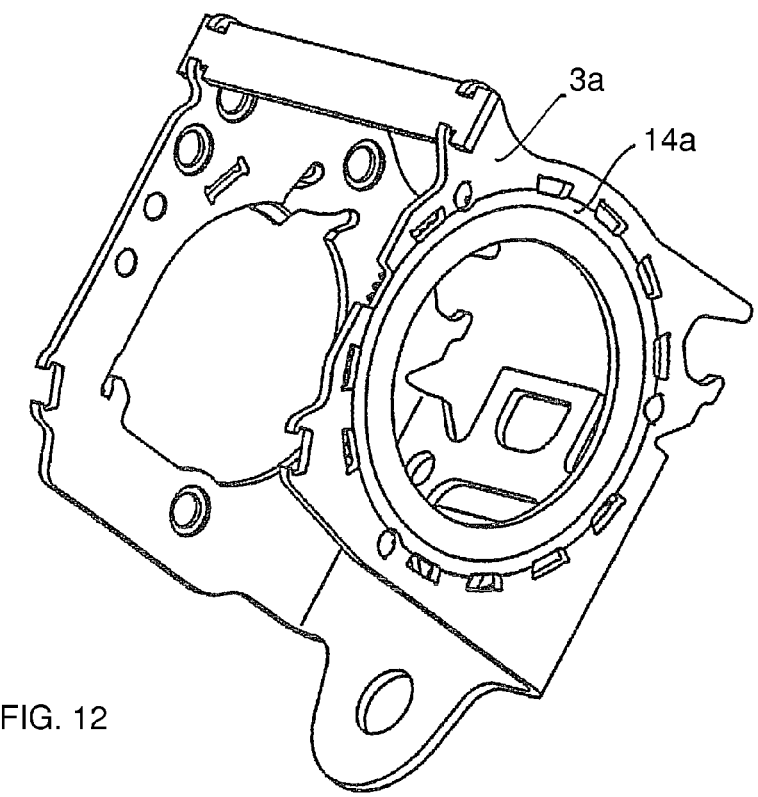
FIG. 12: Retractor frame with stamped axial toothed part in a second view.

FIGS. 11 and 12 present a further, preferred exemplary embodiment of the invention in which the toothed part 14 is an integral component of the bracket 3a, that is, it is deemed as being designed as a single piece with the bracket 3a. This can be realized e.g. in the form of an extra part which is adhered to or pressed onto the bracket 3a, so that the extra part forms a fixed unit with the bracket 3a.

Alternatively, and as is the case in the depicted exemplary embodiment, the toothed part 14 can also be formed by stamping, i.e., by means of depressions arranged at regular, equidistant intervals which are created in the bracket 3a by rolling or by stamping.

Furthermore, the toothed part 14 can also be stamped through, i.e. in the form of recesses arranged at regular, equidistant intervals and which can be produced e.g. by stamping.

The advantage of this proposed embodiment is seen in that the number of parts is reduced, so that the overall production costs can be decreased. Furthermore, this embodiment allows for a flatter structure of the bracket 3a with the toothed part 14, so that the rigidity of the belt retractor is improved and the wall thickness of the bracket 3a can be made smaller. The belt retractor is thus lighter and more cost-effective in general.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A seat belt retractor with a speed-controlled load limiting device for enabling a load-limited extraction of a belt webbing, the seat belt retractor comprising:
   a belt shaft pivot-mounted in a retractor frame,
   a locking device for locking the belt shaft relative to the retractor frame in the belt extraction direction when a predetermined value of at least one of a belt webbing extraction acceleration and a vehicle deceleration is exceeded,
   at least two toothed elements of the load-limiting device including a first toothed element with first teeth and a second toothed element with second teeth, the first and second toothed elements moving relative to each other upon activation of the load limiting device, wherein one of the toothed elements performs an oscillatory motion, wherein
   all of the at least two toothed elements feature teeth, with which they alternately engage and disengage during the relative motion,
   the belt shaft having an at least two-part configuration including a first part and a second part,
   the belt webbing being configured to be wound onto the first part, and the second part of the belt shaft being configured to be locked relative to the retractor frame upon actuation of the locking device, and
   the first toothed element being in a rotationally locked connection with the first part of the at least two parts of the belt shaft and the second toothed element being in a rotationally locked connection with the second part of the at least two parts of the belt shaft, wherein the first and the second teeth are located between the belt webbing and the locking device.

2. The seat belt retractor according to claim 1, wherein the load limiting device comprises a first opening and a second opening configured for mounting the load limiting device on the belt shaft in a rotationally-fixed manner.

3. The seat belt retractor according to claim 2, wherein the openings are designed to be circular and are arranged concentrically to each other.

4. The seat belt retractor according to claim 1, wherein the toothed elements of the load limiting device, which are movable relative to each other, include two discs forming a compact unit and enclosing a hollow space in between, and by a third disc which is located in the hollow space and is movable relative to the two discs.

5. The seat belt retractor according to claim 4, wherein the hollow space is formed by a first one of the two discs with at least one axially directed lug, and by a second one of the two discs being provided with at least one radial tab engaging the at least one axially directed lug in a rotationally fixed manner.

6. The seat belt retractor according to claim 1, wherein one of the first and second parts of the belt shaft has an extension extending into a recess of the respective other one of the first and second parts of the belt shaft, the extension being smaller than the recess, so that a gap is formed between the at least two parts of the belt shaft, into which one of the at least two toothed elements extends, the one of the at least two toothed elements being arranged on the extension in a rotationally fixed manner.

7. The seat belt retractor according to claim 1, wherein the load limiting device is ring-shaped with a central opening and is coaxial with the at least two parts of the belt shaft.

8. The seat belt retractor according to claim 1, wherein the at least two parts of the belt shaft overlap with axial sections, and the load limiting device is in an axial location, in which the axial sections overlap.

9. The seat belt retractor according to claim 1, wherein a first and a second one of the at least two parts of the belt shaft have overlapping axial sections, one of the first and second toothed elements of the load limiting device extending into a free space between the overlapping axial sections of the first and second parts.

10. The seat belt retractor according to claim 1, wherein between the at least two toothed elements, a spring is provided, dimensioned to pretension the at least two toothed elements with a spring force that exerts a greater torque than the tensile force of the belt webbing.

11. The seat belt retractor according to claim 1, wherein the load limiting device is a pre-assembled subassembly.

12. A seat belt retractor with a speed-controlled load limiting device for enabling a load-limited extraction of a belt webbing, the seat belt retractor comprising:
   a belt shaft pivot-mounted in a retractor frame,
   a locking device for locking the belt shaft relative to the retractor frame in the belt extraction direction when a predetermined value of at least one of a belt webbing extraction acceleration and a vehicle deceleration is exceeded,
   at least two toothed elements of the load-limiting device including a first toothed element with first teeth and a second toothed element with second teeth, the first and second toothed elements moving relative to each other upon activation of the load limiting device, wherein one of the toothed elements performs an oscillatory motion, wherein
   all of the at least two toothed elements feature teeth, with which they alternately engage and disengage during the relative motion,
   the belt shaft having an at least two-part configuration including a first part and a second part,
   the belt webbing being configured to be wound onto the first part, and the second part of the belt shaft being configured to be locked relative to the retractor frame upon actuation of the locking device, and
   the first toothed element being in a rotationally locked connection with the first part of the at least two parts of the belt shaft and the second toothed element being in a rotationally locked connection with the second part of the at least two parts of the belt shaft,
   wherein the retractor frame is U-shaped including two opposite brackets, and the first teeth and second teeth of the load limiting device are located between the brackets.

13. The seat belt retractor according to claim 12, wherein at least one of the at least two toothed elements is disposed on one of the brackets.

14. The seat belt retractor according to claim 13, wherein the at least one of the at least two toothed elements is disposed on an extra part which is affixed to the bracket.

15. The seat belt retractor according to claim 13, wherein the at least one of the at least two toothed elements includes equidistantly positioned recesses.

16. A seat belt retractor with a speed-controlled load limiting device for enabling a load-limited extraction of a belt webbing, the seat belt retractor comprising:

a belt shaft pivot-mounted in a retractor frame, a locking device for locking the belt shaft relative to the retractor frame in the belt extraction direction when a predetermined value of at least one of a belt webbing extraction acceleration and a vehicle deceleration is exceeded, at least two toothed elements of the load-limiting device including a first toothed element with first teeth and a second toothed element with second teeth, the first and second toothed elements moving relative to each other upon activation of the load limiting device, wherein one of the toothed elements performs an oscillatory motion, wherein all of the at least two toothed elements feature teeth, with which they alternately engage and disengage during the relative motion, the belt shaft having an at least two-part configuration including a first part and a second part, the belt webbing being configured to be wound onto the first part, and the second part of the belt shaft being configured to be locked relative to the retractor frame upon actuation of the locking device, and each of the at least two toothed elements being allocated to a different part of the at least two parts of the belt shaft, wherein the retractor frame is U-shaped including two opposite brackets, and the first teeth and second teeth of the load limiting device are located between the brackets, wherein the at least one of the at least two toothed elements is formed on one of the two opposite brackets by a stamping process.

* * * * *